(12) United States Patent
Hayashi

(10) Patent No.: US 12,372,024 B2
(45) Date of Patent: Jul. 29, 2025

(54) TURBOCHARGER

(71) Applicant: IHI Corporation, Tokyo (JP)

(72) Inventor: Katsunori Hayashi, Tokyo (JP)

( * ) Notice: Subject to any disclaimer, the term of this patent is extended or adjusted under 35 U.S.C. 154(b) by 53 days.

(21) Appl. No.: 18/051,563

(22) Filed: Nov. 1, 2022

(65) Prior Publication Data

US 2023/0113937 A1   Apr. 13, 2023

Related U.S. Application Data

(63) Continuation of application No. PCT/JP2021/020054, filed on May 26, 2021.

(30) Foreign Application Priority Data

Jun. 18, 2020  (JP) ................................ 2020-105350

(51) Int. Cl.
   *F02B 37/24*  (2006.01)
   *F01D 17/16*  (2006.01)

(52) U.S. Cl.
   CPC .............. *F02B 37/24* (2013.01); *F01D 17/16* (2013.01); *F01D 17/165* (2013.01);
   (Continued)

(58) Field of Classification Search
   CPC ........ F01D 17/16; F01D 17/165; F02B 37/24; F02C 6/12; F05D 2220/40; F05D 2230/64;
   (Continued)

(56) References Cited

U.S. PATENT DOCUMENTS

| | | | |
|---|---|---|---|
| 2003/0170116 A1* | 9/2003 | Knauer | F02B 37/24 415/160 |
| 2005/0252210 A1 | 11/2005 | Shiraishi et al. | |

(Continued)

FOREIGN PATENT DOCUMENTS

| | | | |
|---|---|---|---|
| DE | 102008020932 A1 * | 10/2009 | ........... F01D 17/165 |
| DE | 102008020732 A1 * | 11/2009 | ........... F01D 17/165 |

(Continued)

OTHER PUBLICATIONS

International Search Report dated Jul. 20, 2021 for PCT/JP2021/020054.

(Continued)

*Primary Examiner* — Woody A Lee, Jr.
*Assistant Examiner* — Jesse M Prager
(74) *Attorney, Agent, or Firm* — SOEI PATENT & LAW FIRM

(57) ABSTRACT

A turbocharger includes a bearing housing, a variable displacement mechanism, and a restricting member. The variable displacement mechanism includes a nozzle ring and a drive ring. The restricting member includes a flange part, a drive ring guide pin part, and a phase determining pin part. The flange part straddles a first surface of the nozzle ring facing the bearing housing and a second surface of the drive ring facing the bearing housing so that a position thereof with respect to the nozzle ring is fixed. The drive ring guide pin part is formed integrally with the flange part and disposed in a first hole formed on the first surface. The phase determining pin part is formed integrally with the flange part and disposed in a second hole formed on a third surface of the bearing housing facing the variable displacement mechanism.

19 Claims, 10 Drawing Sheets

(52) U.S. Cl.
CPC .... *F05D 2220/40* (2013.01); *F05D 2240/128* (2013.01); *F05D 2260/60* (2013.01)

(58) Field of Classification Search
CPC .......... F05D 2240/128; F05D 2260/30; F05D 2260/31; F05D 2260/37
See application file for complete search history.

(56) References Cited

U.S. PATENT DOCUMENTS

| | | | | |
|---|---|---|---|---|
| 2008/0223956 A1* | 9/2008 | Jinnai | ................... | F01D 17/165 239/265.35 |
| 2014/0147254 A1 | 5/2014 | Tashiro et al. | | |

FOREIGN PATENT DOCUMENTS

| | | | | |
|---|---|---|---|---|
| DE | 102012006710 A1 * | 7/2013 | ............ | F01D 25/24 |
| JP | 2000-199433 | 7/2000 | | |
| JP | 2004-156592 | 6/2004 | | |
| JP | 2006-514191 | 4/2006 | | |
| JP | 2010-203239 | 9/2010 | | |
| JP | 2013-072401 | 4/2013 | | |
| WO | 2004/035991 | 4/2004 | | |
| WO | 2011/068267 | 6/2011 | | |
| WO | WO-2018102244 A1 * | 6/2018 | ........... | F01D 17/165 |

OTHER PUBLICATIONS

International Preliminary Report on Patentability with Written Opinion dated Dec. 29, 2022 for PCT/JP2021/020054.

* cited by examiner

TURBOCHARGER

CROSS-REFERENCE TO RELATED APPLICATION

This application is a continuation application of PCT Application No. PCT/JP2021/020054, filed May 26, 2021, the entire contents of which are incorporated herein by reference.

BACKGROUND

Japanese Unexamined Patent Publication No. 2006-514191, Japanese Unexamined Patent Publication No. 2006-514191 and No. 2004-156592 describe a turbocharger including a variable displacement mechanism. For example, the variable displacement mechanism described in Patent Literature 1 includes a nozzle ring, a drive ring, a roller pin and a roller. The roller pin and the roller maintain a positional relationship in an axial direction between the nozzle ring and the drive ring.

In such a turbocharger described above, there are cases in which a restricting member is provided between a bearing housing and a variable displacement mechanism to maintain a positional relationship in a circumferential direction between the bearing housing and the variable displacement mechanism.

In such a case, since a space for disposing the restricting member needs to be secured in addition to the roller pin and the roller, this might cause a decrease in the freedom with which the variable displacement mechanism is designed.

Therefore, an objective of the present disclosure is to provide a turbocharger in which a degree of freedom in designing a variable displacement mechanism is improved.

SUMMARY

A turbocharger which is one example of the present disclosure includes a bearing housing rotatably supporting a rotating shaft to which a turbine wheel is fixed, a variable displacement mechanism surrounding the turbine wheel and configured to guide a fluid to the turbine wheel, and a plurality of restricting members provided between the bearing housing and the variable displacement mechanism, in which the variable displacement mechanism includes a nozzle ring surrounding the turbine wheel in a circumferential direction with a rotation axis of the rotating shaft as a center, and a drive ring surrounding the nozzle ring in the circumferential direction, the nozzle ring has a first surface facing the bearing housing, the drive ring has a second surface facing the bearing housing, the bearing housing has a third surface facing the variable displacement mechanism, and at least one restricting member of the plurality of restricting members includes a flange part which straddles the first surface and the second surface so that a position thereof with respect to the nozzle ring is fixed, a first pin formed integrally with the flange part and disposed in a first hole formed on the first surface, and a second pin formed integrally with the flange part and disposed in a second hole formed on the third surface.

According to the present disclosure, it is possible to provide a turbocharger in which a degree of freedom in designing a variable displacement mechanism is improved.

DETAILED DESCRIPTION

Figure 1:
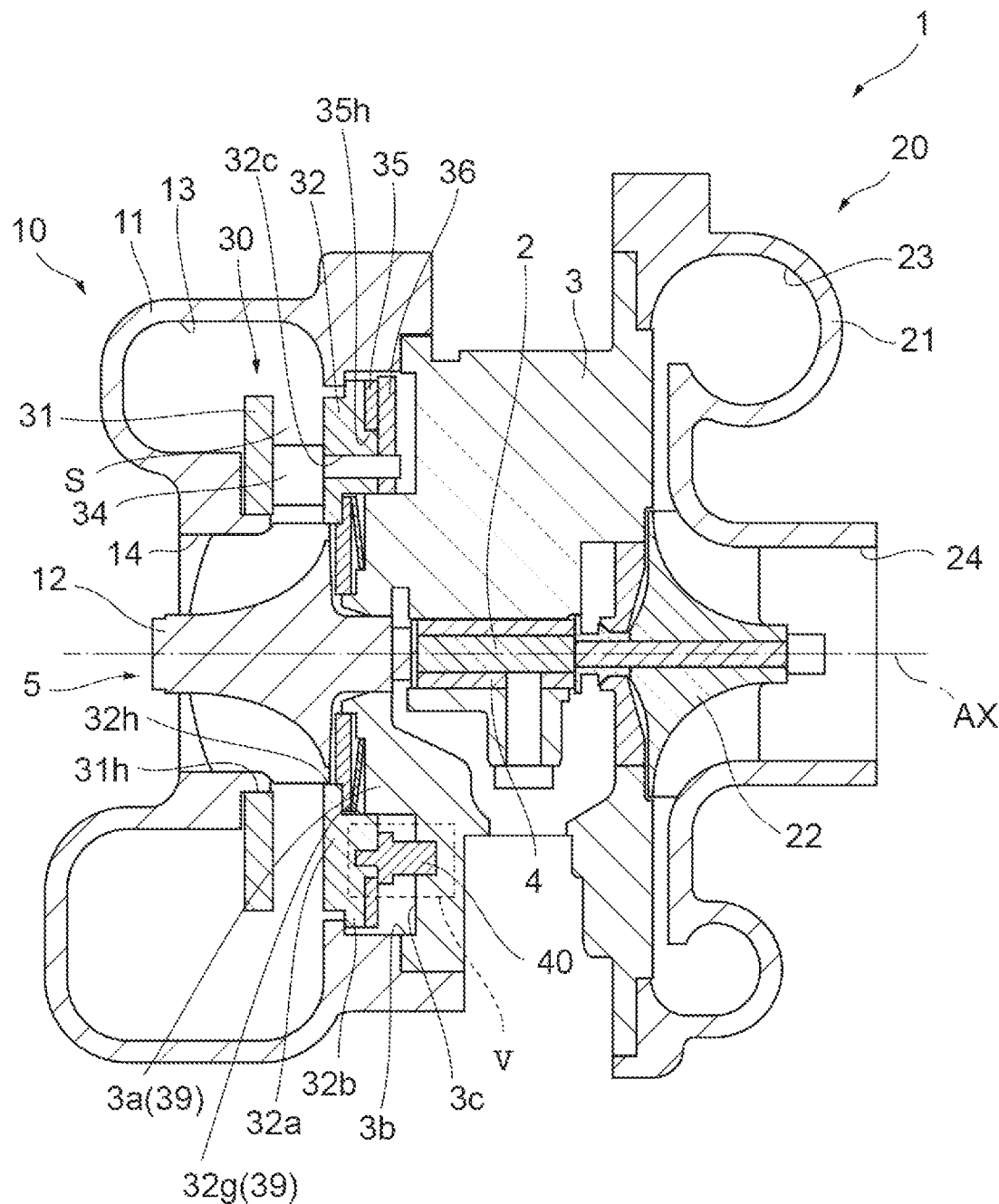
FIG. 1 is a cross-sectional view illustrating a turbocharger of a first example.

A turbocharger which is one example of the present disclosure includes a bearing housing rotatably supporting a rotating shaft to which a turbine wheel is fixed, a variable displacement mechanism surrounding the turbine wheel and configured to guide a fluid to the turbine wheel, and a plurality of restricting members provided between the bearing housing and the variable displacement mechanism, in which the variable displacement mechanism includes a nozzle ring surrounding the turbine wheel in a circumferential direction with a rotation axis of the rotating shaft as a center, and a drive ring surrounding the nozzle ring in the circumferential direction, the nozzle ring has a first surface facing the bearing housing, the drive ring has a second surface facing the bearing housing, the bearing housing has a third surface facing the variable displacement mechanism, and at least one restricting member of the plurality of restricting members includes a flange part which straddles the first surface and the second surface so that a position thereof with respect to the nozzle ring is fixed, a first pin formed integrally with the flange part and disposed in a first hole formed on the first surface, and a second pin formed integrally with the flange part and disposed in a second hole formed on the third surface.

According to the turbocharger, a positional relationship between the nozzle ring and the drive ring in the axial direction along the rotation axis can be maintained by the flange part. Also, a positional relationship between the bearing housing and the variable displacement mechanism in the circumferential direction can be maintained by the first pin and the first hole, and the second pin and the second hole. That is, in the turbocharger, the positional relationship between the nozzle ring and the drive ring is maintained, and the positional relationship between the bearing housing and the variable displacement mechanism is maintained by the restricting members. Thereby, an available space increases in the first surface of the nozzle ring and the second surface of the drive ring compared to a case in which, for example, the positional relationship between the nozzle ring and the drive ring and the positional relationship between the bearing housing and the variable displacement mechanism are maintained by separate members. Therefore, a degree of freedom in designing the variable displacement mechanism improves.

In one example, the first pin may be fixed to the nozzle ring. According to this configuration, when the first pin is fixed to the nozzle ring, a position of the flange part with respect to the nozzle ring can be fixed.

In one example, the second hole may be an elongated hole extending in a radial direction intersecting the rotation axis, and a diameter of the second pin may be smaller than a width of the second hole. When the turbocharger is in an operating state, a high-temperature gas is supplied to the turbocharger. As a result, temperatures of parts such as the variable displacement mechanism forming the turbocharger rise. When temperatures of the parts rise, thermal deformation occurs in the parts. The parts forming the turbocharger have diverse degrees of thermal deformation with respect to temperature. According to the above-described configuration, thermal deformation of the bearing housing and the variable displacement mechanism in the radial direction can be allowed.

In one example, the diameter of the second pin may be larger than a diameter of the first pin. According to this configuration, a surface area of the second pin can be relatively increased by relatively increasing the diameter of the second pin. Thereby, wear of the second pin can be suppressed.

In one example, the second pin may be fixed to the bearing housing. According to this configuration, when the second pin is fixed to the bearing housing, the position of the flange part with respect to the nozzle ring can be fixed.

In one example, the first hole may be an elongated hole extending in a radial direction intersecting the rotation axis, and a diameter of the first pin may be smaller than a width of the first hole. According to this configuration, as described above, thermal deformation of the bearing housing and the variable displacement mechanism in the radial direction can be allowed.

In one example, the diameter of the first pin may be larger than a diameter of the second pin. According to this configuration, a surface area of the first pin can be relatively increased by relatively increasing the diameter of the first pin. Thereby, wear of the first pin can be suppressed.

In one example, the plurality of restricting members may all include the flange part, the first pin, and the second pin. According to this configuration, the positional relationship between the nozzle ring and the drive ring in the axial direction can be more reliably maintained, and stability of a structure of the turbocharger including the variable displacement mechanism can be secured.

In one example, the turbocharger may include the plurality of restricting members, in which a plurality of first holes in which the first pins of the plurality of restricting members are disposed may be formed on the first surface, and a plurality of second holes in which the second pins of the plurality of restricting members are disposed may be formed on the third surface. According to this configuration, the positional relationship between the nozzle ring and the drive ring in the axial direction can be more reliably maintained by the plurality of restricting members. As a result, change in the positional relationship between the nozzle ring and the drive ring due to thermal deformation can be suppressed. Therefore, unintended movement of the variable displacement mechanism that may occur due to change in the positional relationship between the nozzle ring and the drive ring is suppressed, and thereby performance of the turbocharger can be reliably exhibited.

Hereinafter, examples for implementing the present disclosure will be described in detail with reference to the accompanying drawings. In the description of the drawings, the same elements will be denoted by the same reference signs, and duplicate description thereof will be omitted.

First Example

<Turbocharger>

Figure 2:
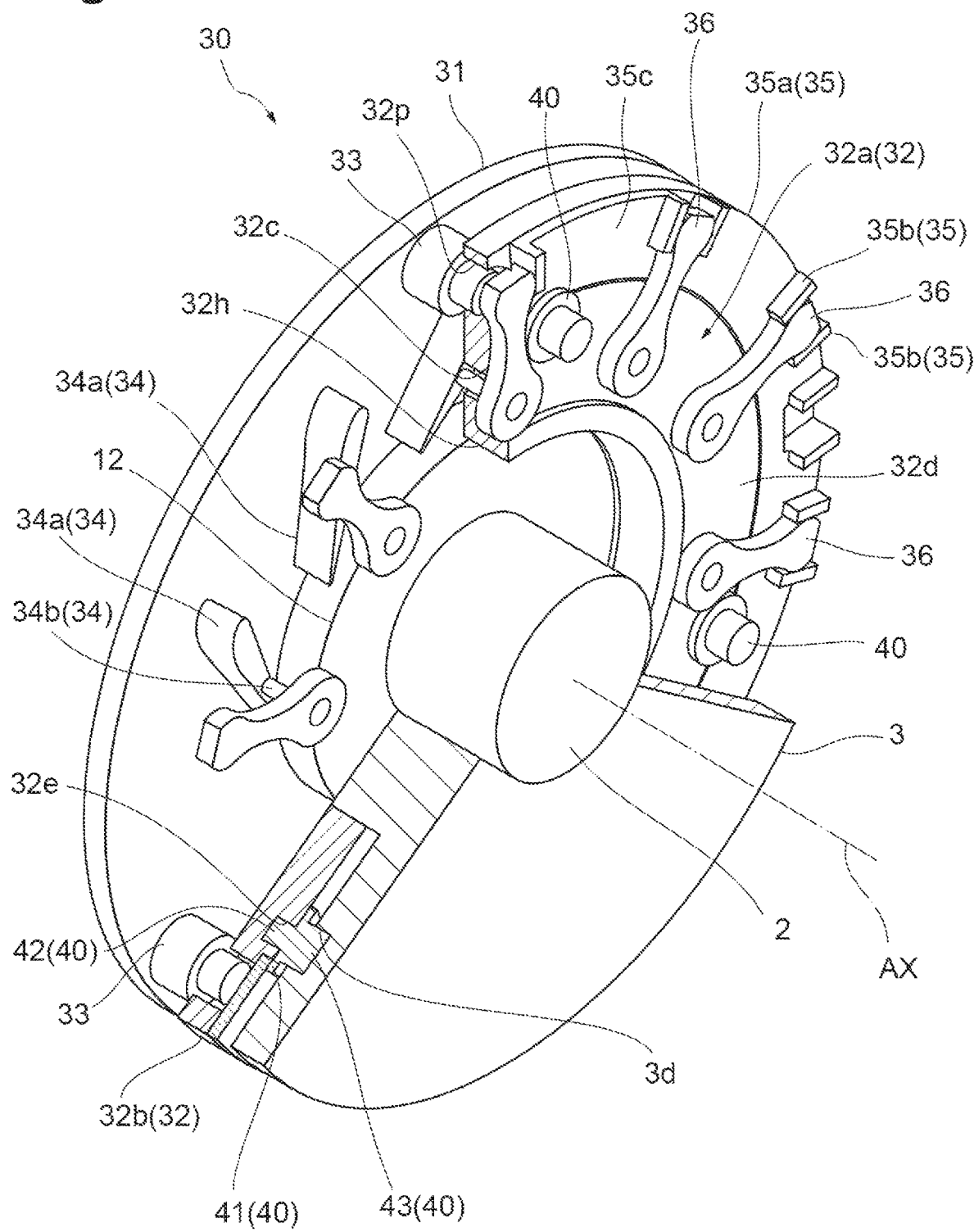
FIG. 2 is a perspective view illustrating a variable displacement mechanism illustrated in FIG. 1.

A turbocharger 1 illustrated in FIGS. 1 and 2 is a variable displacement type turbocharger. The turbocharger 1 is applied to, for example, an internal combustion engine of a ship or a vehicle. The turbocharger 1 includes a turbine 10 and a compressor 20. The turbine 10 includes a turbine housing 11, a turbine wheel 12, and a variable displacement mechanism 30. The turbine housing 11 includes a scroll flow path 13. The scroll flow path 13 extends around the turbine wheel 12 in a circumferential direction centered on a rotation axis AX (hereinafter, simply referred to as a "circumferential direction") to be described later. The compressor 20 includes a compressor housing 21 and a compressor wheel 22. The compressor wheel 22 is housed in the compressor housing 21. The compressor housing 21 includes a scroll flow path 23. The scroll flow path 23 extends around the compressor wheel 22 in a circumferential direction.

The turbine wheel 12 is provided at a first end of a rotating shaft 2. The compressor wheel 22 is provided at a second end of the rotating shaft 2. A bearing housing 3 is provided between the turbine housing 11 and the compressor housing 21. The rotating shaft 2 is rotatably supported by the bearing housing 3 via a bearing 4. The rotating shaft 2, the turbine wheel 12, and the compressor wheel 22 form an integrated rotating body 5. The rotating body 5 rotates around the rotation axis AX of the rotating shaft 2.

The turbine housing 11 has an inlet (not illustrated) and an outlet 14. An exhaust gas discharged from an internal combustion engine (not illustrated) flows into the turbine housing 11 through the inlet. The exhaust gas that has flowed in flows into the turbine wheel 12 through the scroll flow path 13. Then, the exhaust gas rotates the turbine wheel 12. Thereafter, the exhaust gas flows out to the outside of the turbine housing 11 through the outlet 14.

The compressor housing 21 has a suction port 24 and a discharge port (not illustrated). When the turbine wheel 12 rotates, the compressor wheel 22 rotates via the rotating shaft 2. The rotating compressor wheel 22 suctions outside air through the suction port 24. The suctioned air is compressed by passing through the compressor wheel 22 and the scroll flow path 23. The air is discharged from the discharge port as compressed air. The compressed air is supplied to the internal combustion engine.

The turbine 10 includes a connection flow path S. The connection flow path S guides the exhaust gas from the scroll flow path 13 to the turbine wheel 12. A plurality of nozzle vanes 34 are disposed in the connection flow path S. The plurality of nozzle vanes 34 are disposed at regular intervals on a reference circle centered on the rotation axis AX. The nozzle vanes 34 adjacent to each other form a nozzle. The nozzle vanes 34 rotate around a rotation axis parallel to the rotation axis AX in synchronization. When the plurality of nozzle vanes 34 rotate, a cross-sectional area of the connection flow path S is adjusted. As a mechanism for adjusting the cross-sectional area of the connection flow path S, the turbine 10 has a variable displacement mechanism 30. The variable displacement mechanism 30 is attached to the turbine housing 11. The variable displacement mechanism 30 surrounds the turbine wheel 12 and guides the exhaust gas (fluid) to the turbine wheel 12.

<Variable Displacement Mechanism>

Figure 3:
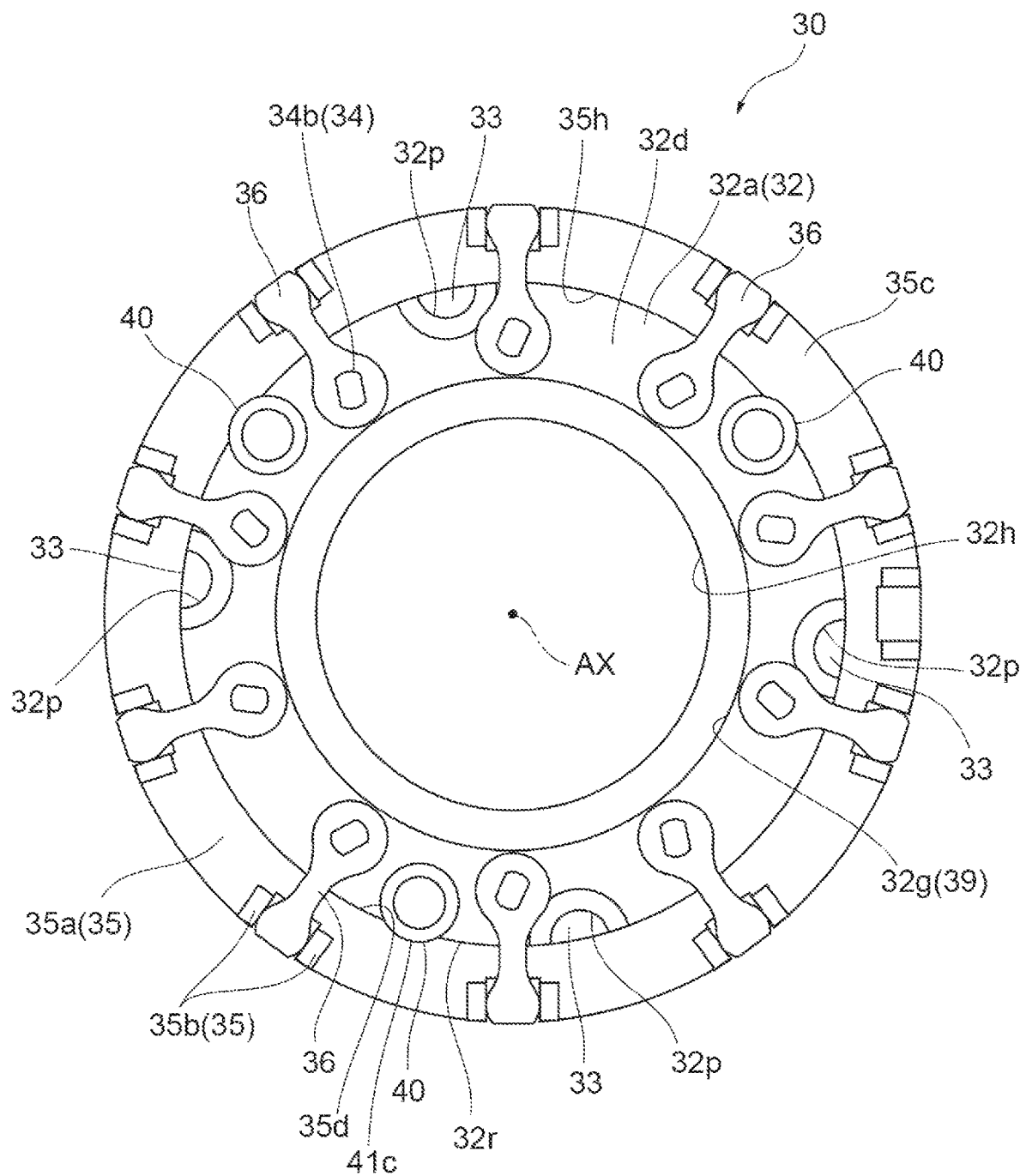
FIG. 3 is a plan view illustrating the variable displacement mechanism illustrated in FIG. 1.

As illustrated in FIGS. 1 to 3, the variable displacement mechanism 30 includes a CC plate (Clearance Control Plate) 31, a nozzle ring 32, and a plurality of CC pins (Clearance Control Pins) 33. The nozzle ring 32 faces the CC plate 31. The CC pins 33 connect the CC plate 31 and the nozzle ring 32. The connection flow path S is formed between the CC plate 31 and the nozzle ring 32. The variable displacement mechanism 30 further includes the plurality of nozzle vanes 34, a drive ring 35, a plurality of nozzle link plates 36, and a drive link plate (not illustrated). The nozzle link plates 36 and the drive link plate are disposed on a side opposite to the CC plate 31 with respect to the nozzle ring 32. The drive ring 35 and the drive link plate cooperate to rotate the nozzle link plates 36. When the nozzle link plates 36 rotate, the nozzle vanes 34 rotate.

A shape of the CC plate 31 is a ring shape centered on the rotation axis AX. The CC plate 31 has a shaft hole 31$h$ (see FIG. 1). The CC plate 31 surrounds the turbine wheel 12 disposed in the shaft hole 31$h$ in the circumferential direction. The CC plate 31 is disposed between the scroll flow path 13 and the outlet 14. The CC plate 31 is separated from the nozzle ring 32 in the axial direction along the rotation axis AX (hereinafter, simply referred to as an "axial direction"). The connection flow path S is formed between the CC plate 31 and the nozzle ring 32. The connection flow path S connects the scroll flow path 13 to the outlet 14. The CC plate 31 is disposed on a side opposite to the bearing housing 3 with respect to the nozzle ring 32. The CC plate 31 has a plurality of pin holes (not illustrated). Intervals between the plurality of pin holes of the CC plate 31 in the circumferential direction are equal to each other.

A shape of the nozzle ring 32 is also a ring shape centered on the rotation axis AX. The nozzle ring 32 has a shaft hole 32$h$ (through hole). The nozzle ring 32 also surrounds the turbine wheel 12 disposed in the shaft hole 32$h$ in the circumferential direction. The nozzle ring 32 is also disposed between the scroll flow path 13 and the outlet 14. The CC plate 31 is parallel to the nozzle ring 32. The nozzle ring 32 has a plurality of pin holes 32$p$. Intervals between the plurality of pin holes 32$p$ in the circumferential direction are equal to each other. Central axes of the pin holes 32$p$ overlap central axes of the pin holes of the CC plate 31. In other words, the pin holes 32$p$ are respectively coaxial with the pin holes of the CC plate 31.

The nozzle ring 32 includes a nozzle ring main body 32$a$ and a nozzle ring flange 32$b$. The nozzle ring main body 32$a$ has a cylindrical shape and has the shaft hole 32$h$. The nozzle ring main body 32$a$ has a plurality of vane shaft holes 32$c$. Intervals of the plurality of vane shaft holes 32$c$ in the circumferential direction are equal to each other. The nozzle ring main body 32$a$ has a first surface 32$d$ facing the bearing housing 3. A plurality (for example, three) of first holes 32$e$ are formed on the first surface 32$d$. A cross-sectional shape of each of the first holes 32$e$ is circular. The first hole 32$e$ does not penetrate the nozzle ring main body 32$a$. That is, the first hole 32$e$ has a bottom surface.

The nozzle ring flange 32$b$ protrudes radially from an outer circumferential surface of the nozzle ring main body 32$a$. An outer diameter of the nozzle ring 32 is defined by an outer diameter of the nozzle ring flange 32$b$. The nozzle ring flange 32$b$ has the plurality of pin holes 32$p$. Position of the pin holes 32$p$ are outside of positions of the vane shaft holes 32$c$ in the radial direction of the nozzle ring 32.

The nozzle ring 32 is separated from the CC plate 31. That is, a gap is formed between the nozzle ring 32 and the CC plate 31. This gap serves as a connection flow path S through which the exhaust gas passes. The gap between the nozzle ring 32 and the CC plate 31 is maintained by the CC pins 33. First ends of the CC pins 33 are inserted into the pin holes of the CC plate 31. Second ends of the CC pins 33 are inserted into the pin holes 32$p$ of the nozzle ring 32.

The plurality of nozzle vanes 34 are disposed on a reference circle centered on the rotation axis AX. The nozzle vanes 34 each include a vane main body 34$a$ and a vane shaft 34$b$. The vane main body 34$a$ is disposed between the CC plate 31 and the nozzle ring 32. In other words, the vane main body 34$a$ is disposed in the connection flow path S. A first end of the vane shaft 34$b$ is fixed to the vane main body 34$a$. A second end of the vane shaft 34$b$ is inserted into the vane shaft hole 32$c$ of the nozzle ring 32. A distal end portion of the second end of the vane shaft 34$b$ protrudes from the nozzle ring main body 32$a$. The vane shaft 34$b$ is rotatable with respect to the nozzle ring 32. The vane main body 34$a$ rotates in accordance with rotation of the vane shaft 34$b$. In the variable displacement mechanism 30, the cross-sectional area of the connection flow path S is adjusted by rotating the vane main body 34$a$. As a result of adjusting the cross-sectional area, a flow velocity of the exhaust gas supplied from the scroll flow path 13 to the turbine wheel 12 is controlled. Therefore, a rotation speed of the turbine wheel 12 can be controlled to a desired value.

The drive ring 35 is disposed on the nozzle ring flange 32$b$. A shape of the drive ring 35 is a ring shape centered on the rotation axis AX. The drive ring 35 has a shaft hole 35$h$. The nozzle ring main body 32$a$ is inserted into the shaft hole 35$h$. That is, the drive ring 35 surrounds the nozzle ring main body 32$a$ in the circumferential direction and is coaxial with the nozzle ring 32. The drive ring 35 is rotatable with respect to the nozzle ring 32 with the rotation axis AX as a center. The drive ring 35 includes a drive ring main body 35$a$ and a plurality of link plate disposing parts 35$b$. The drive ring main body 35$a$ has a second surface 35$c$ facing the bearing housing 3. Intervals of the link plate disposing parts 35$b$ in the circumferential direction are equal to each other. The link plate disposing parts 35$b$ each include two upright members that are separated from each other in the circumferential direction.

A shape of each of the nozzle link plates 36 is bar-shaped. A first end of the nozzle link plate 36 is fixed to an end portion of the vane shaft 34$b$. A second end of the nozzle link plate 36 is disposed in the link plate disposing part 35$b$ of the drive ring 35. More specifically, the second end of the nozzle link plate 36 is disposed between the two upright members of the link plate disposing part 35$b$. When the drive ring 35 receives a driving force from the drive link plate, the drive ring 35 rotates around the rotation axis AX. Due to this rotation, the second end of the nozzle link plate 36 moves in the circumferential direction in accordance with the rotation of the drive ring 35. Thereby, the nozzle link plate 36 rotates with the vane shaft 34$b$ as a center. When the nozzle link plate 36 rotates, the vane shaft 34$b$ attached to the first end of the nozzle link plate 36 rotates. In accordance with this, the vane main body 34$a$ attached to the first end of the vane shaft 34$b$ rotates. As a result, a distance between the vane main bodies 34$a$ changes. That is, the cross-sectional area of the connection flow path S changes.

The variable displacement mechanism 30 is positioned with respect to the bearing housing 3. More specifically, a protruding part 3$a$ of the bearing housing 3 is fitted in an inner circumferential surface 32$g$ of the nozzle ring 32 of the variable displacement mechanism 30. Specifically, an outer circumferential surface of the protruding part 3$a$ (fitting part) is in contact with the inner circumferential surface 32$g$. Therefore, the variable displacement mechanism 30 and the bearing housing 3 cooperate to form a fit-in structure (embedded structure, centering location structure, spigot type structure) 39. More specifically, the inner circumferential surface 32$g$ of the nozzle ring main body 32$a$ and the protruding part 3$a$ of the bearing housing 3 form the fit-in structure 39. A position of the variable displacement mechanism 30 with respect to the bearing housing 3 is determined by the fit-in structure 39.

<Restricting Member>

The turbocharger 1 further includes a plurality (for example, three) of restricting members 40 provided between the bearing housing 3 and the variable displacement mechanism 30. Hereinafter, the restricting member 40 will be described in detail.

Figure 4:
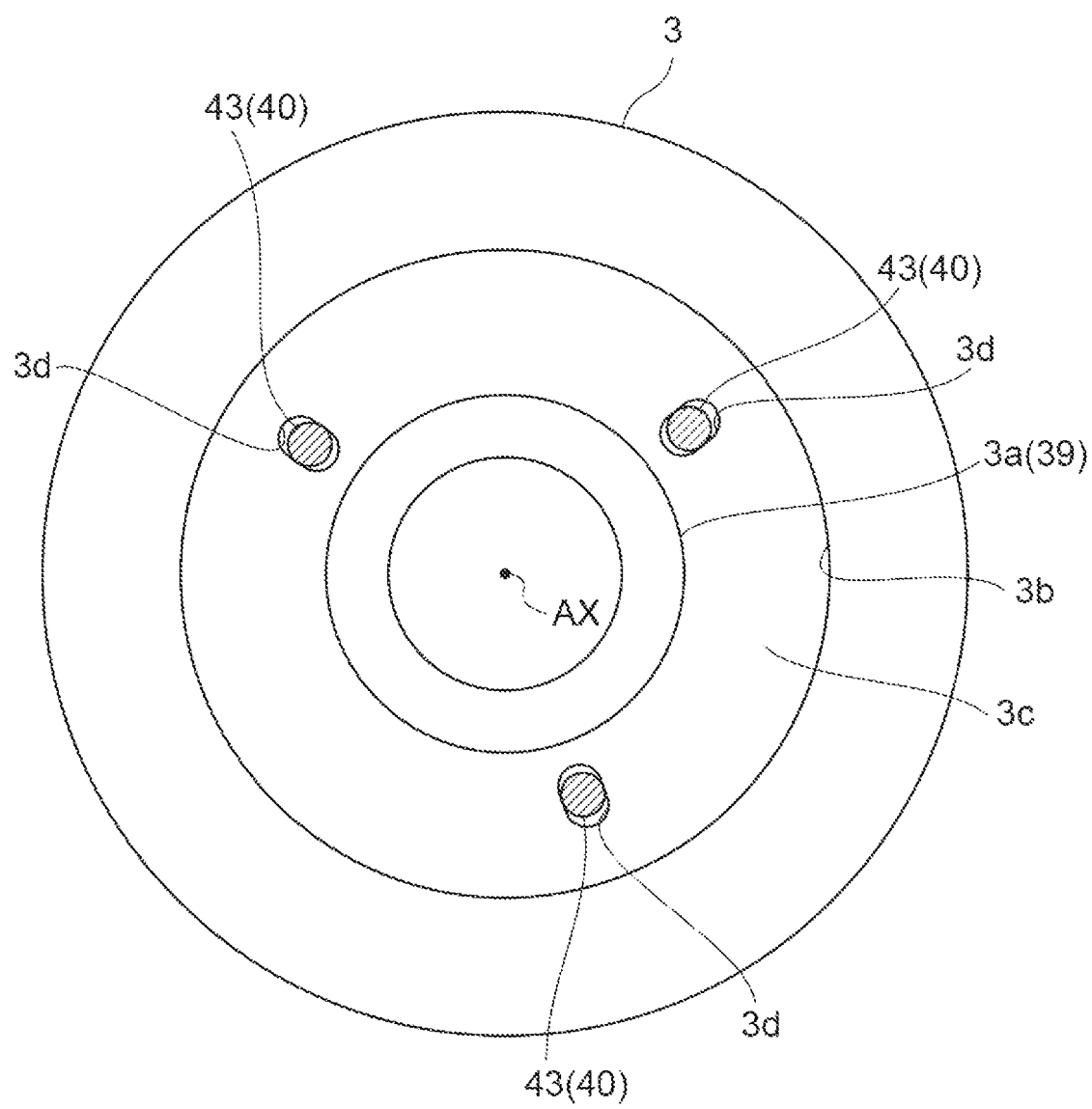
FIG. 4 is a plan view illustrating a bearing housing illustrated in FIG. 1.

As illustrated in FIGS. 1 and 4, an annular recessed part 3b is formed in the bearing housing 3. The recessed part 3b includes a third surface 3c facing the variable displacement mechanism 30. The third surface 3c is a bottom surface of the recessed part 3b. A plurality (for example, three) of second holes 3d are formed on the third surface 3c. The second hole 3d is an elongated hole extending in the radial direction intersecting the rotation axis AX (hereinafter, simply referred to as a "radial direction").

When viewed from the axial direction, a length of the second hole 3d in the radial direction is larger than a width of the second hole 3d in the circumferential direction. When viewed from the axial direction, the second hole 3d includes an intermediate portion extending in the radial direction and end portions connected to both ends of the intermediate portion in the radial direction. A shape of each of the end portions is, for example, a semicircle. A diameter of the semicircle is the same as a width of the intermediate portion in the circumferential direction. The second hole 3d does not penetrate the bearing housing 3. That is, the second hole 3d has a bottom surface.

Figure 5:
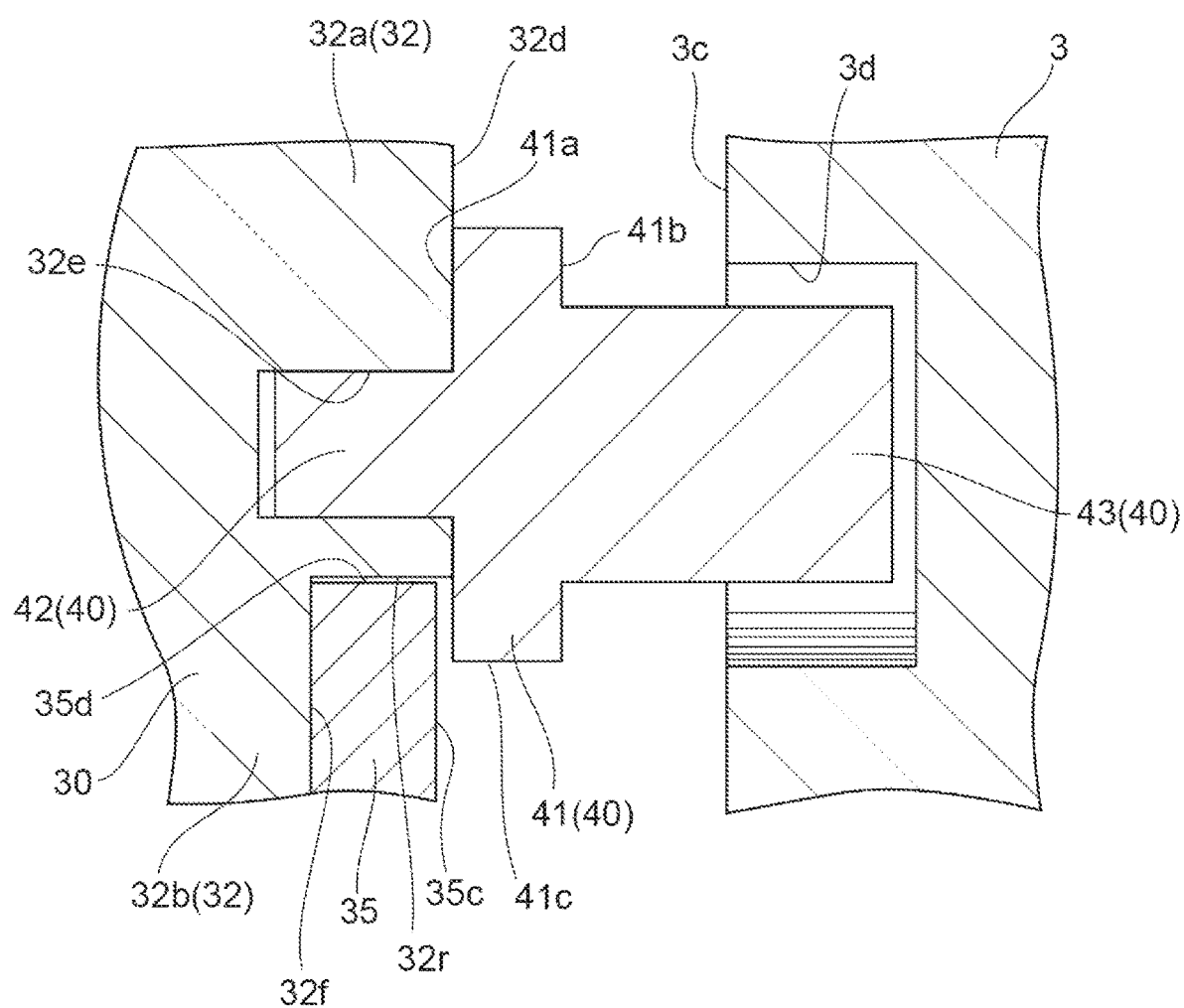
FIG. 5 is an enlarged view of a portion V of FIG. 1.

As illustrated in FIG. 5, the first surface 32d and the second surface 35c of the variable displacement mechanism 30 are separated from the third surface 3c of the bearing housing 3. The restricting members 40 are provided between the variable displacement mechanism 30 and the bearing housing 3 to maintain a positional relationship between the nozzle ring 32 and the drive ring 35 in the axial direction and maintain a positional relationship between the variable displacement mechanism 30 and the bearing housing 3 in the circumferential direction.

Specifically, the restricting members 40 are fixed to the variable displacement mechanism 30. The restricting members 40 each have a flange part 41, a drive ring guide pin part 42 (first pin), and a phase determining pin part 43 (second pin). A shape of the flange part 41 is a disc shape. The flange part 41 straddles the first surface 32d and the second surface 35c. The flange part 41 overlaps a part of the first surface 32d and a part of the second surface 35c when viewed from the axial direction. A diameter of the flange part 41 is larger than a diameter of the first hole 32e. An outer edge 41c of the flange part 41 includes a portion positioned on a side opposite to the rotation axis AX with respect to an outer edge 32r of the nozzle ring main body 32a (see FIG. 3). The outer edge 41c of the flange part 41 includes a portion positioned on a side opposite to the rotation axis AX with respect to an inner edge 35d of the drive ring 35 (see FIG. 3).

A thickness of the flange part 41 is smaller than a distance between the first surface 32d and the third surface 3c. A restricting surface 41a of the flange part 41 is in contact with the first surface 32d. A surface 41b of the flange part 41 on a side opposite to the restricting surface 41a is separated from the third surface 3c. The flange part 41 maintains a positional relationship between the nozzle ring 32 and the drive ring 35 in the axial direction. The flange part 41 prevents the drive ring 35 from falling off from the nozzle ring 32. Specifically, when the drive ring 35 moves toward the bearing housing 3 in the axial direction with respect to the nozzle ring 32, the drive ring 35 comes into contact with the restricting surface 41a of the flange part 41. That is, movement of the drive ring 35 in the axial direction is limited by the flange part 41.

Further, a thickness of the drive ring 35 is smaller than a distance between the first surface 32d and a guide surface (a surface facing the drive ring 35) 32f of the nozzle ring flange 32b. That is, the thickness of the drive ring 35 is smaller than a distance between the restricting surface 41a and the guide surface 32f. Thereby, the drive ring 35 can rotate between the guide surface 32f and the restricting surface 41a.

The drive ring guide pin part 42 is provided on the restricting surface 41a of the flange part 41. The drive ring guide pin part 42 is integrally formed with the flange part 41. A shape of the drive ring guide pin part 42 is columnar. A diameter of the drive ring guide pin part 42 is smaller than the diameter of the flange part 41. A length of the drive ring guide pin part 42 is smaller than a depth of the first hole 32e. The drive ring guide pin part 42 is disposed in the first hole 32e. The drive ring guide pin part 42 is fixed to the nozzle ring 32. The drive ring guide pin part 42 is press-fitted into the first hole 32e. Thereby, a position of the flange part 41 with respect to the nozzle ring 32 is fixed. The drive ring guide pin part 42 is separated from the bottom surface of the first hole 32e.

The phase determining pin part 43 is provided on the surface 41b of the flange part 41. The phase determining pin part 43 is integrally formed with the flange part 41. A shape of the phase determining pin part 43 is columnar. A diameter of the phase determining pin part 43 is smaller than the diameter of the flange part 41. The diameter of the phase determining pin part 43 is larger than the diameter of the drive ring guide pin part 42. A length of the phase determining pin part 43 is larger than a distance between the surface 41b of the flange part 41 and the third surface 3c. The length of the phase determining pin part 43 is larger than a depth of the second hole 3d. A distal end portion of the phase determining pin part 43 is disposed in the second hole 3d. The phase determining pin part 43 is separated from the bottom surface of the second hole 3d.

The diameter of the phase determining pin part 43 is the same as or slightly smaller than the width of the second hole 3d in the circumferential direction. The phase determining pin part 43 is inserted into the second hole 3d. A side surface of the phase determining pin part 43 is in contact with side surfaces of the intermediate portion of the second hole 3d (side surfaces facing each other in the circumferential direction). The phase determining pin part 43 is movable in the radial direction with respect to the second hole 3d. In other words, in a state in which the phase determining pin part 43 is disposed in the second hole 3d, movement of the phase determining pin part 43 in the radial direction is allowed, and movement of the phase determining pin part 43 in the other directions is prohibited.

Operation and Effects

As described above, according to the turbocharger 1, the positional relationship between the nozzle ring 32 and the drive ring 35 in the axial direction can be maintained by the flange part 41. Also, the positional relationship between the bearing housing 3 and the variable displacement mechanism 30 in the circumferential direction can be maintained by the drive ring guide pin part 42 and the first hole 32e, and the phase determining pin part 43 and the second hole 3d. That is, in the turbocharger 1, the positional relationship between the nozzle ring 32 and the drive ring 35, and the positional relationship between the bearing housing 3 and the variable displacement mechanism 30 are maintained by the restricting members 40. Thereby, an available space increases in the first surface 32*d* of the nozzle ring 32 and the second surface 35*c* of the drive ring 35 compared to a case in which, for example, the positional relationship between the nozzle ring 32 and the drive ring 35 and the positional relationship between the bearing housing 3 and the variable displacement mechanism 30 are maintained by separate members. Therefore, a degree of freedom in designing the variable displacement mechanism 30 improves. Also, since the restricting member 40 can be further provided in the increased available space in the first surface 32*d* of the nozzle ring 32 and the second surface 35*c* of the drive ring 35, for example, wear of the phase determining pin part 43 can be suppressed by increasing the number of the restricting members 40. Also, according to the turbocharger 1, since the number of parts can be reduced compared to a case in which, for example, the positional relationship between the nozzle ring 32 and the drive ring 35 and the positional relationship between the bearing housing 3 and the variable displacement mechanism 30 are maintained by separate members, assembling can be simplified and costs can be reduced.

Figure 8:
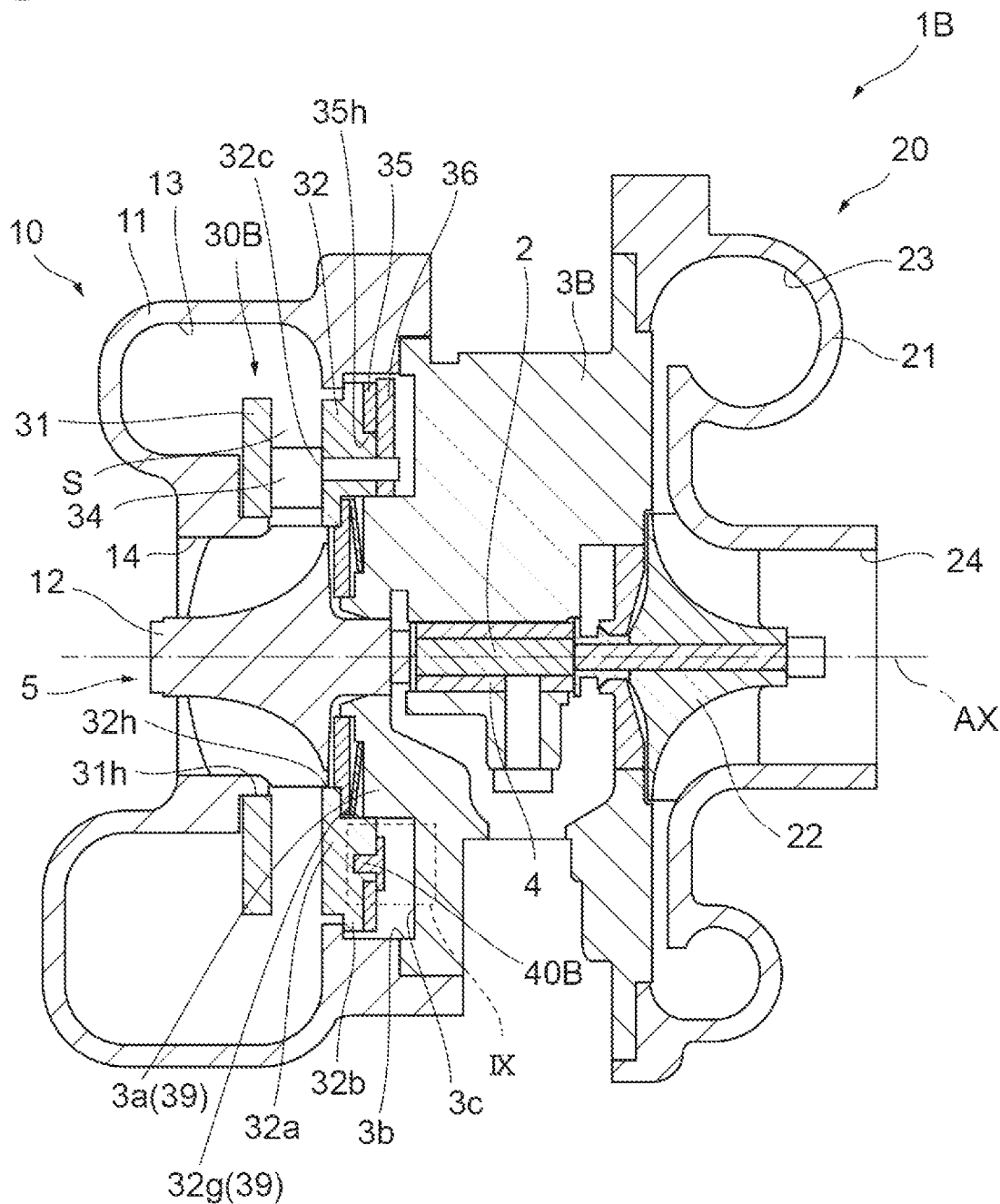
FIG. 8 is a cross-sectional view illustrating a turbocharger of a comparative example.
Figure 9:
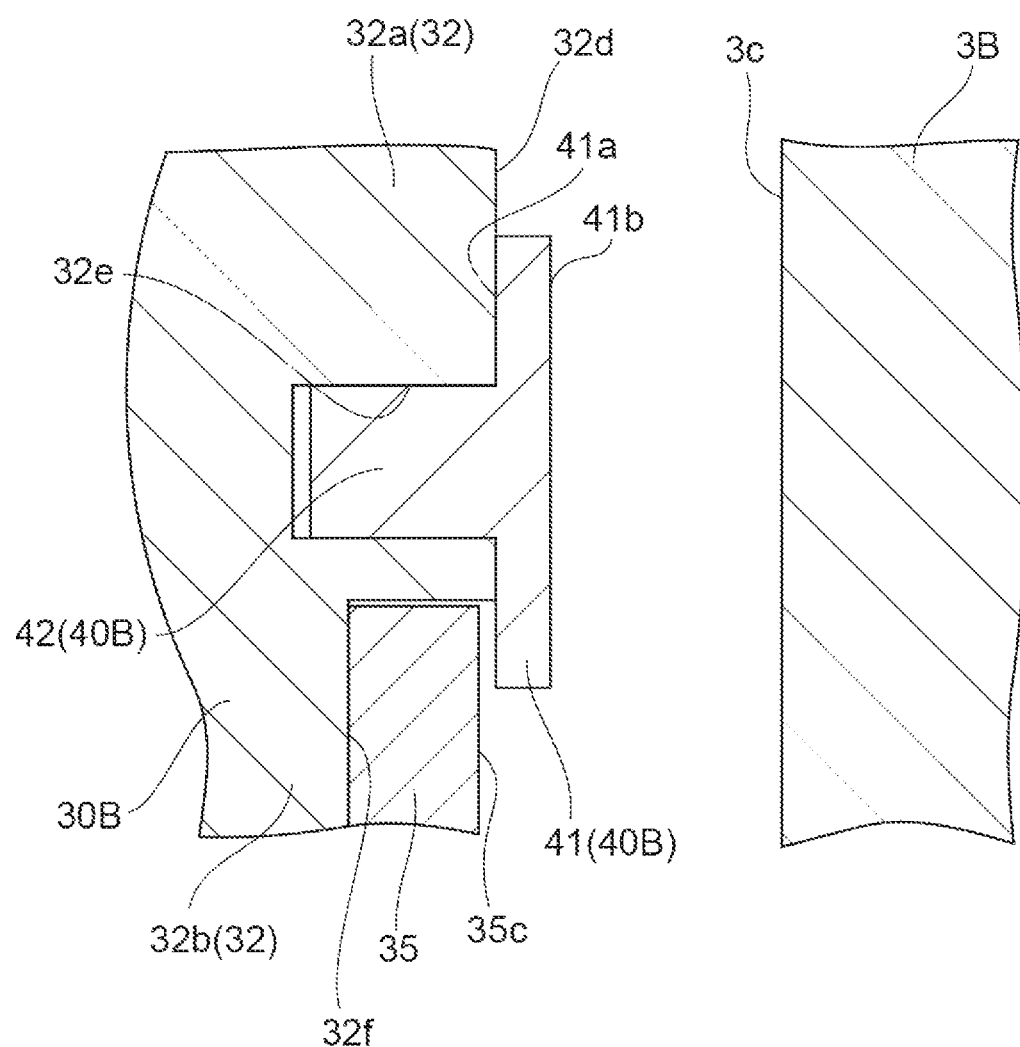
FIG. 9 is an enlarged view of a portion IX of FIG. 8.
Figure 10:
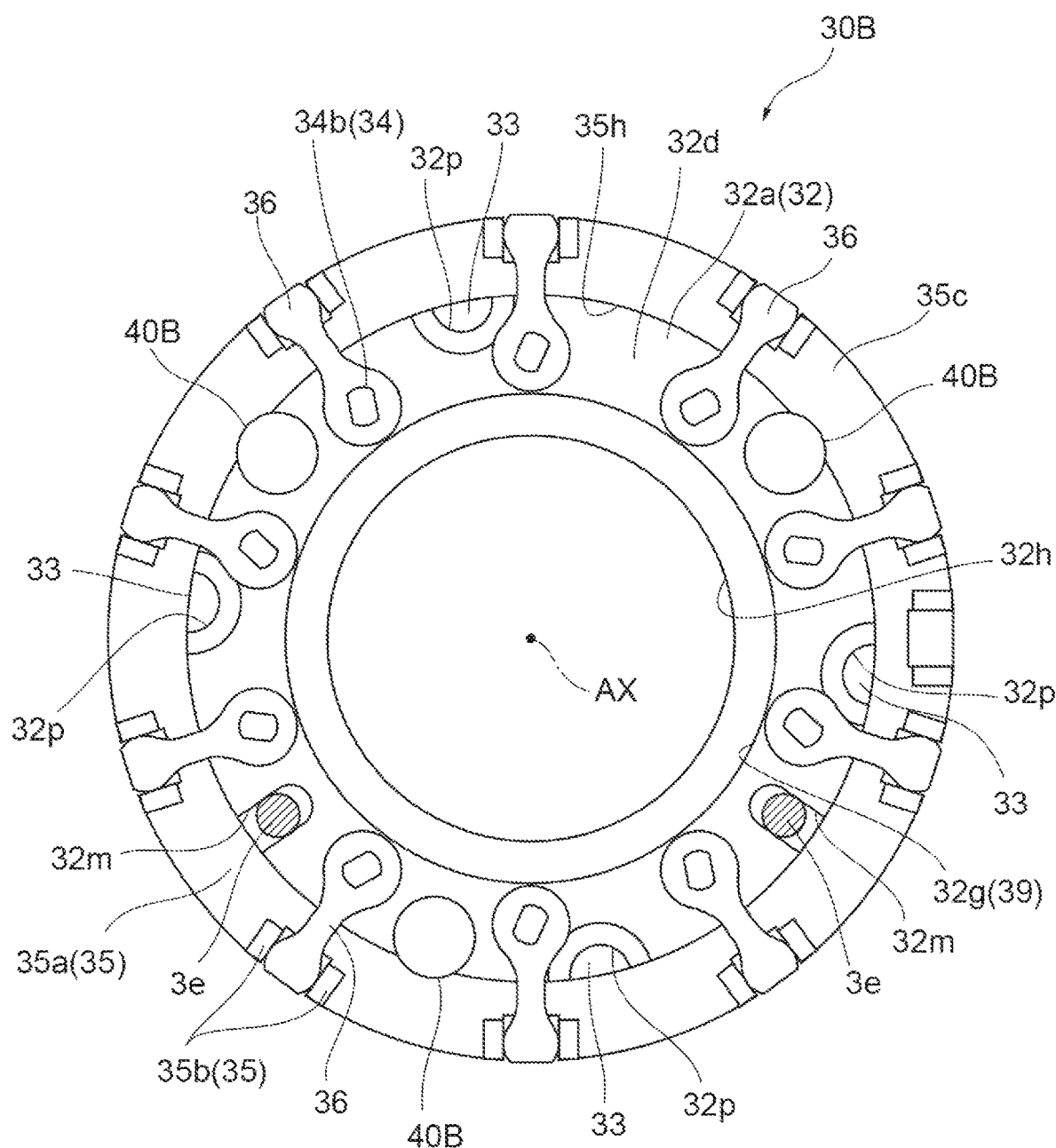
FIG. 10 is a plan view illustrating a variable displacement mechanism of the turbocharger of the comparative example.

FIGS. 8 to 10 are views illustrating a turbocharger 1B of a comparative example. As illustrated in FIGS. 8 and 9, the turbocharger 1B includes a restricting member 40B. The restricting member 40B differs from the restricting member 40 in that it does not have the phase determining pin part 43. The restricting member 40B only maintains a positional relationship between the nozzle ring 32 and the drive ring 35 in the axial direction, and does not maintain a positional relationship between the variable displacement mechanism 30 and the bearing housing 3 in the circumferential direction.

As illustrated in FIG. 10, in the turbocharger 1B, a positional relationship between a variable displacement mechanism 30B and a bearing housing 3B in the circumferential direction is maintained by a pin 3*e* of the bearing housing 3B and a hole 32*m* of the variable displacement mechanism 30B. Specifically, in the variable displacement mechanism 30B, a plurality of holes 32*m* are formed on the first surface 32*d* of the nozzle ring 32. Then, the pin 3*e* of the bearing housing 3B is inserted into each of the holes 32*m*. As described above, in the turbocharger 1B of the comparative example, not only a place in which the restricting member 40B is disposed but also places in which the plurality of holes 32*m* are formed are necessary on the first surface 32*d* of the nozzle ring 32.

On the other hand, in the turbocharger 1 of the example, the positional relationship between the nozzle ring 32 and the drive ring 35 and the positional relationship between the bearing housing 3 and the variable displacement mechanism 30 are maintained by the restricting members 40 as described above. Therefore, the holes 32*m* or the like may not be provided on the first surface 32*d* of the nozzle ring 32 to maintain the positional relationship between the bearing housing 3 and the variable displacement mechanism 30 in the circumferential direction as in the turbocharger 1B of the comparative example. Thereby, an available space increases in the first surface 32*d* of the nozzle ring 32 and the second surface 35*c* of the drive ring 35 as described above.

Since the number of parts in the variable displacement mechanism is large, there may be a strict restriction on disposition of the part. In such a variable displacement mechanism, it is particularly significant that one part has a plurality of functions like the restricting member 40. Specifically, for example, in the variable displacement mechanism 30B of the comparative example, the plurality of nozzle link plates 36 and a plurality of restricting members 40B are formed on the first surface 32*d* of the nozzle ring 32 and the second surface 35*c* of the drive ring 35 as illustrated in FIG. 10. Also, the plurality of pin holes 32*p* and the plurality of holes 32*m* are formed on the first surface 32*d*.

In designing such a variable displacement mechanism, for example, first, a space for disposing the plurality of nozzle link plates 36 is secured on the first surface 32*d* and the second surface 35*c*. Next, in the first surface 32*d* and the second surface 35*c*, a space for disposing the plurality of pin holes 32*p* is secured in a space other than the space in which the plurality of nozzle link plates 36 are disposed. Next, in the first surface 32*d* and the second surface 35*c*, a space for disposing the plurality of restricting members 40B is secured in a space other than the space in which the plurality of nozzle link plates 36 and the plurality of pin holes 32*p* are disposed. Next, in the first surface 32*d* and the second surface 35*c*, a space for disposing the plurality of holes 32*m* is secured in a space other than the space in which the plurality of nozzle link plates 36, the plurality of pin holes 32*p*, and the plurality of restricting members 40B are disposed.

As described above, in design of the variable displacement mechanism 30, a space in which various parts or the like are disposed on a circumference centered on the rotation axis AX is sequentially secured. That is, components such as the nozzle link plates 36 and the pin holes 32*p* are disposed in a finite region on the circumference centered on the rotation axis AX. Then, for a part or the like that is relatively later in an order of securing a space (hereinafter referred to as "the part or the like"), a space left may be relatively small, and thus this might cause a decrease in the freedom with which the part or the like is designed. Specifically, for example, a case in which the part or the like is disposed at a position deviated from an ideal position to be disposed, a dimension of the part or the like is made smaller than an ideal dimension thereof, or the like can be conceivable. Therefore, it is particularly important to increase the available space in the first surface 32*d* and the second surface 35*c* of the variable displacement mechanism 30.

Also, the drive ring guide pin part 42 is fixed to the nozzle ring 32. According to this configuration, when the drive ring guide pin part 42 is fixed to the nozzle ring 32, a position of the flange part 41 with respect to the nozzle ring 32 can be fixed.

Also, the second hole 3*d* is an elongated hole extending in the radial direction. The diameter of the phase determining pin part 43 is smaller than the width of the second hole. When the turbocharger 1 is in an operating state, a high-temperature gas is supplied to the turbocharger 1. As a result, temperatures of parts such as the variable displacement mechanism 30 forming the turbocharger 1 rise. When temperatures of the parts rise, thermal deformation occurs in the parts. The parts forming the turbocharger 1 have diverse degrees of thermal deformation with respect to temperature. According to the above-described configuration, in a state in which the phase determining pin part 43 is disposed in the second hole 3*d*, since movement of the phase determining pin part 43 in the radial direction is allowed, thermal deformation of the bearing housing 3 and the variable displacement mechanism 30 in the radial direction can be allowed.

Also, the diameter of the phase determining pin part 43 is larger than the diameter of the drive ring guide pin part 42. According to this configuration, a surface area of the phase determining pin part 43 can be relatively increased by relatively increasing the diameter of the phase determining pin part 43. Thereby, wear of the phase determining pin part 43 can be suppressed.

Also, the plurality of restricting members 40 may all include the flange part 41, the drive ring guide pin part 42, and the phase determining pin part 43. According to this configuration, the positional relationship between the nozzle ring 32 and the drive ring 35 in the axial direction can be more reliably maintained, and stability of a structure of the turbocharger 1 including the variable displacement mechanism 30 can be secured.

Also, the turbocharger 1 includes the plurality of restricting members 40. The plurality of first holes 32e in which the drive ring guide pin parts 42 of the plurality of restricting members 40 are disposed are formed on the first surface 32d. The plurality of second holes 3d in which the phase determining pin parts 43 of the plurality of restricting members 40 are disposed are formed on the third surface 3c. According to this configuration, the positional relationship between the nozzle ring 32 and the drive ring 35 in the axial direction is more reliably maintained by the plurality of restricting members 40. As a result, change in the positional relationship between the nozzle ring 32 and the drive ring 35 due to thermal deformation can be suppressed. Therefore, unintended movement of the variable displacement mechanism 30 that may occur due to change in the positional relationship between the nozzle ring 32 and the drive ring 35 is suppressed, and thereby performance of the turbocharger 1 can be reliably exhibited.

Also, as described above, when the turbocharger 1 is in an operating state, the parts forming the turbocharger 1 have various degrees of thermal deformation with respect to temperature. If there is a difference in the degree of thermal deformation, a positional relationship between the parts might change. Change in the positional relationship between the parts affects characteristics of the turbocharger 1. According to the above-described configuration, even when thermal deformation occurs, the positional relationship between the bearing housing 3 and the variable displacement mechanism 30 is maintained by the restriction due to the plurality of phase determining pin parts 43 and the plurality of second holes 3d. Therefore, the turbocharger 1 can exhibit desired performance even during operation. Specifically, the nozzle ring 32 of the example expands as a whole due to thermal deformation. It is assumed that the thermal deformation is isotropic in the circumferential direction and does not differ depending on a direction. Then, the plurality of phase determining pin parts 43 and the plurality of second holes 3d allow only deformation in the radial direction. Then, due to the thermal deformation, a gap is generated between the inner circumferential surface 32g of the nozzle ring 32 and the outer circumferential surface of the protruding part 3a of the bearing housing 3. Due to the gap, a positional relationship between the bearing housing 3 and the nozzle ring 32 tends to change relatively. However, parallel translation of the variable displacement mechanism 30 is restricted by the plurality of phase determining pin parts 43 and the plurality of second holes 3d. Then, a direction of movement allowed by one phase determining pin part 43 and one second hole 3d corresponding to each other, and a direction of movement allowed by another phase determining pin part 43 and another second hole 3d that are different from the one phase determining pin part 43 and the one second hole 3d are different from each other. Therefore, parallel translation of the nozzle ring 32 in substantially all directions is restricted. That is, the nozzle ring 32 is only allowed to expand or contract in an isotropic manner with a center of the nozzle ring 32 as a starting point. As a result, even when thermal deformation occurs, the relative positional relationship between the bearing housing 3 and the variable displacement mechanism 30 is maintained. Therefore, the turbocharger 1 can exhibit desired performance even during operation.

Second Example

Figure 6:
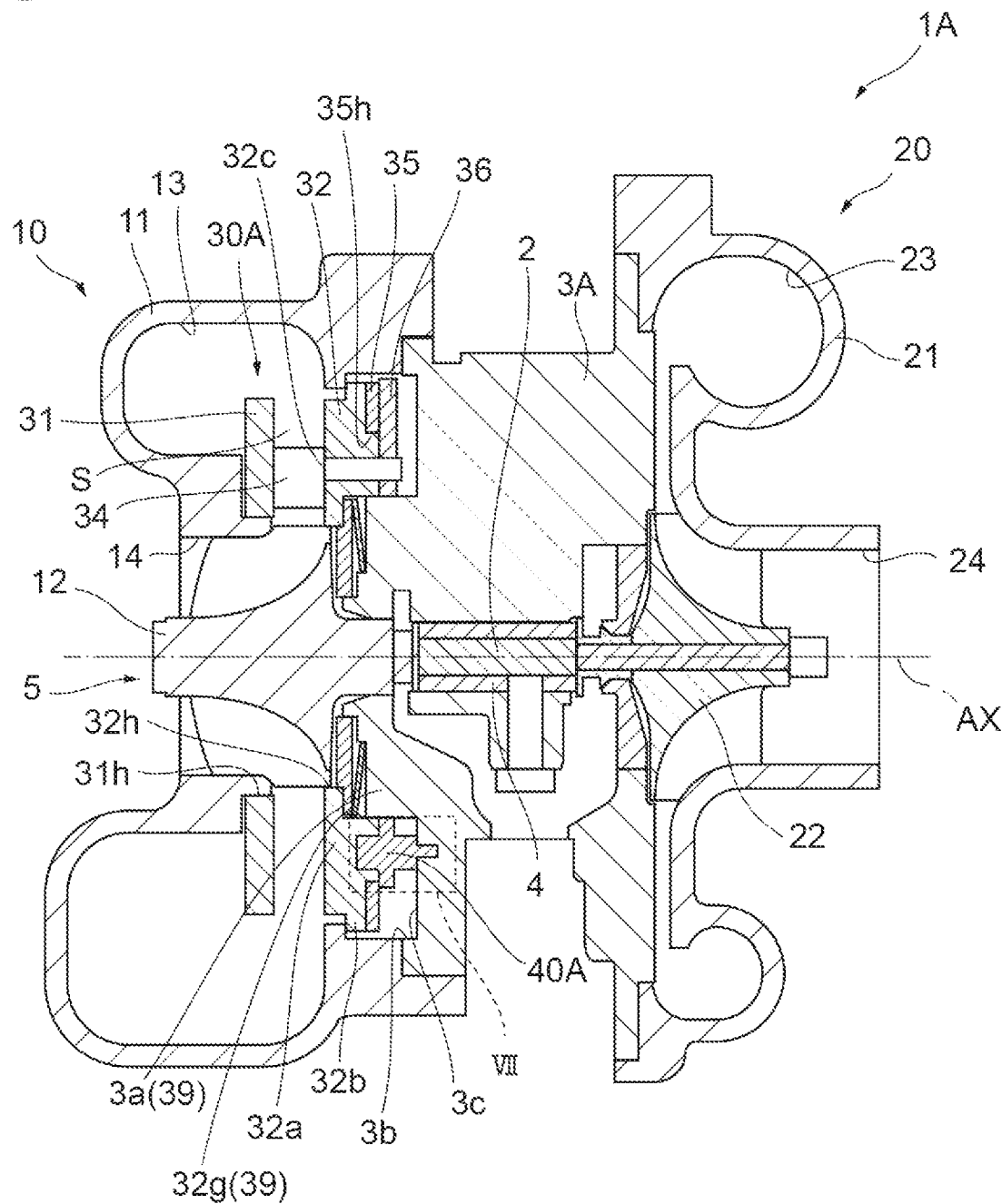
FIG. 6 is a cross-sectional view illustrating a turbocharger of a second example.
Figure 7:
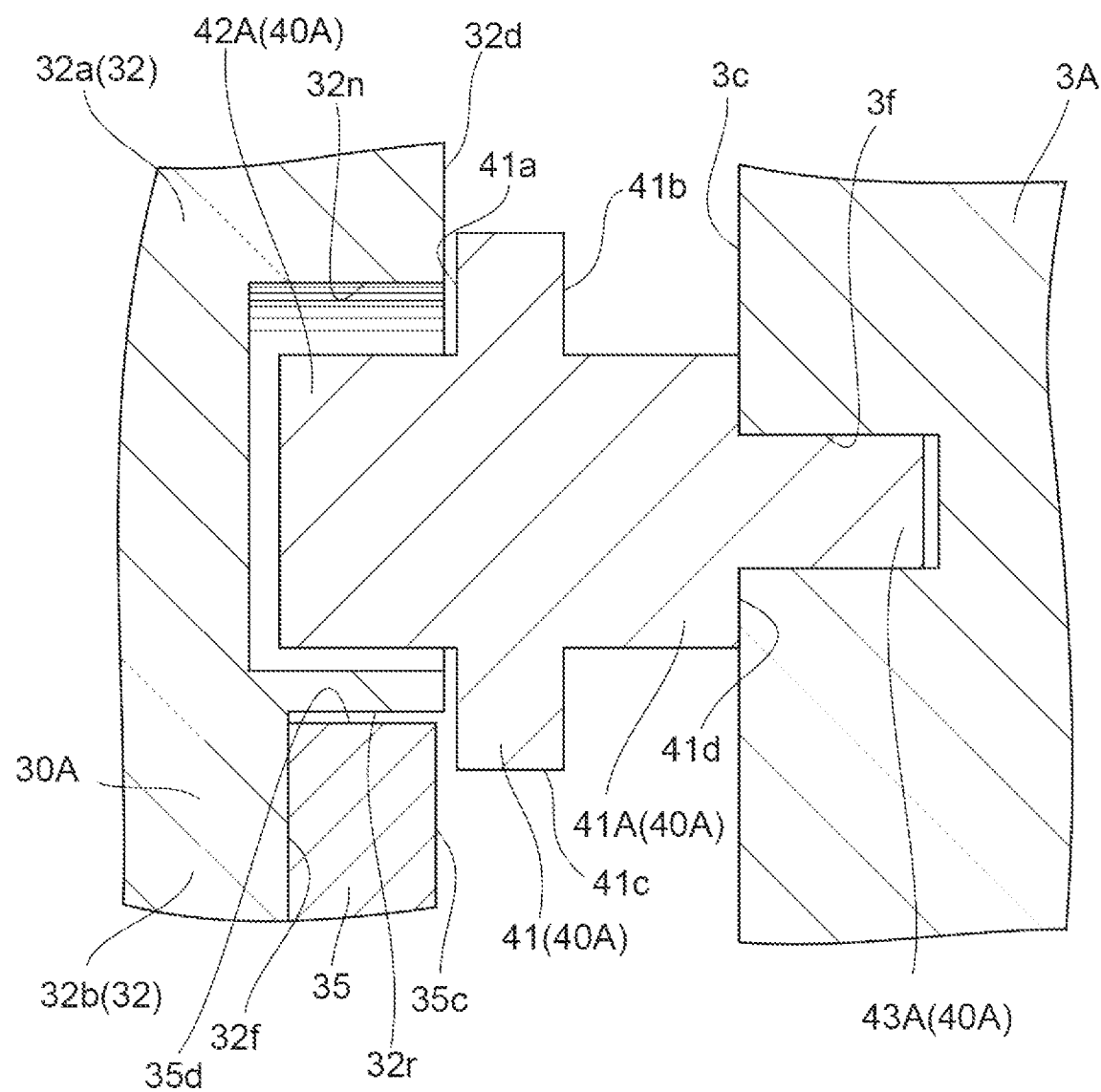
FIG. 7 is an enlarged view of a portion VII of FIG. 6.

As illustrated in FIGS. 6 and 7, a turbocharger 1A of a second example is mainly different from the turbocharger 1 of the first example in that it includes a restricting member 40A instead of the restricting member 40, and in that the restricting member 40A is fixed to a bearing housing 3A. Since the other configurations of the turbocharger 1A of the second example are the same as those of the turbocharger 1 of the first example, detailed description thereof will be omitted.

On a first surface 32d of a variable displacement mechanism 30A, a plurality of first holes 32n are formed in place of the plurality of first holes 32e. The first holes 32n are each an elongated hole extending in a radial direction. When viewed from an axial direction, a length of the first hole 32n in the radial direction is larger than a width of the first hole 32n in a circumferential direction. When viewed from the axial direction, the first hole 32n includes an intermediate portion extending in the radial direction and end portions connected to both ends of the intermediate portion in the radial direction. A shape of each of the end portions is, for example, a semicircle. A diameter of the semicircle is the same as a width of the intermediate portion in the circumferential direction. The first hole 32n does not penetrate a nozzle ring 32. That is, the first hole 32n has a bottom surface.

On a third surface 3c, a plurality of second holes 3f are formed in place of the plurality of second holes 3d. A cross-sectional shape of each of the second holes 3f is circular. The second hole 3f does not penetrate the bearing housing 3A. That is, the second hole 3f has a bottom surface.

The restricting member 40A is fixed to the bearing housing 3A. The restricting member 40A includes a flange part 41, a connecting part 41A, a drive ring guide pin part 42A, and a phase determining pin part 43A. A diameter of the flange part 41 is larger than a width of the first hole 32n in the circumferential direction. The diameter of the flange part 41 is larger than a width of the first hole 32n in the radial direction.

The connecting part 41A is provided on a surface 41b of the flange part 41. The connecting part 41A is integrally formed with the flange part 41. A shape of the connecting part 41A is columnar. A diameter of the connecting part 41A is smaller than the diameter of the flange part 41. The diameter of the connecting part 41A is larger than a diameter of the second hole 3f. A length of the connecting part 41A is substantially the same as a distance between the surface 41b of the flange part 41 and the third surface 3c. A surface 41d of the connecting part 41A on a side opposite to the flange part 41 is in contact with the third surface 3c.

The phase determining pin part 43A is provided on the surface 41d of the connecting part 41A. The phase determining pin part 43A is integrally formed with the connecting part 41A. That is, the phase determining pin part 43A is integrally formed with the flange part 41 together with the connecting part 41A. A shape of the phase determining pin part 43A is columnar. A diameter of the phase determining pin part 43A is smaller than the diameter of the connecting part 41A. A length of the phase determining pin part 43A is smaller than a depth of the second hole 3f. The phase determining pin part 43A is disposed in the second hole 3f. The phase determining pin part 43A is fixed to the bearing housing 3A. The phase determining pin part 43A is press-fitted into the second hole 3f. Thereby, a position of the flange part 41 with respect to the nozzle ring 32 is fixed. The phase determining pin part 43A is separated from the bottom surface of the second hole 3f.

The drive ring guide pin part 42A is provided on a restricting surface 41a of the flange part 41. The drive ring guide pin part 42A is integrally formed with the flange part 41. A shape of the drive ring guide pin part 42A is columnar. A diameter of the drive ring guide pin part 42A is larger than the diameter of the phase determining pin part 43A. The diameter of the drive ring guide pin part 42A is substantially the same as the diameter of the connecting part 41A. The drive ring guide pin part 42A is disposed in the first hole 32n. The drive ring guide pin part 42A is separated from the bottom surface of the first hole 32n.

The diameter of the drive ring guide pin part 42A is smaller than a width of the first hole 32n in the circumferential direction. The drive ring guide pin part 42A is inserted into the first hole 32n. A side surface of the drive ring guide pin part 42A is in contact with side surfaces of the intermediate portion of the first hole 32n (side surfaces facing each other in the circumferential direction). The drive ring guide pin part 42A is movable in the radial direction with respect to the first hole 32n. In other words, in a state in which the drive ring guide pin part 42A is disposed in the first hole 32n, movement of the drive ring guide pin part 42A in the radial direction is allowed, and movement of the drive ring guide pin part 42A in the other directions is prohibited.

As described above, in the turbocharger 1A of the second example, the phase determining pin part 43A is fixed to the bearing housing 3A. According to this configuration, when the phase determining pin part 43A is fixed to the bearing housing 3A, a position of the flange part 41 with respect to the nozzle ring 32 can be fixed.

Also, the first hole 32n is an elongated hole extending in the radial direction. The diameter of the drive ring guide pin part 42A is smaller than the width of the first hole 32n. According to this configuration, as described above, thermal deformation of the bearing housing 3A and the variable displacement mechanism 30A in the radial direction can be allowed.

Also, the diameter of the drive ring guide pin part 42A is larger than the diameter of the phase determining pin part 43A. According to this configuration, a surface area of the drive ring guide pin part 42A can be relatively increased by relatively increasing the diameter of the drive ring guide pin part 42A. Thereby, wear of the drive ring guide pin part 42A can be suppressed.

It is to be understood that not all aspects, advantages and features described herein may necessarily be achieved by, or included in, any one particular example. Indeed, having described and illustrated various examples herein, it should be apparent that other examples may be modified in arrangement and detail. For example, an example in which the plurality of restricting members 40 all include the flange part 41, the drive ring guide pin part 42, and the phase determining pin part 43 has been illustrated, but at least one restricting member 40 of the plurality of restricting members 40 may include the flange part 41, the drive ring guide pin part 42, and the phase determining pin part 43. That is, of the three restricting members 40, two restricting members 40 may each include the flange part 41, the drive ring guide pin part 42, and the phase determining pin part 43, and the other one restricting member 40 may include the flange part 41 and the drive ring guide pin part 42 and may not include the phase determining pin part 43. Also, of the three restricting members 40, one restricting member 40 may include the flange part 41, the drive ring guide pin part 42, and the phase determining pin part 43, and the other two restricting members 40 may each include the flange part 41 and the drive ring guide pin part 42 and may not include the phase determining pin part 43.

The invention claimed is:

1. A turbocharger comprising:
    a bearing housing rotatably supporting a rotating shaft to which a turbine wheel is fixed;
    a variable displacement mechanism surrounding the turbine wheel and configured to guide a fluid to the turbine wheel; and
    a plurality of restricting members provided between the bearing housing and the variable displacement mechanism,
    wherein the variable displacement mechanism includes:
        a nozzle ring surrounding the turbine wheel in a circumferential direction with a rotation axis of the rotating shaft as a center; and
        a drive ring surrounding the nozzle ring in the circumferential direction,
    wherein the nozzle ring has a first surface facing the bearing housing,
    wherein the drive ring has a second surface facing the bearing housing,
    wherein the bearing housing has a third surface facing the variable displacement mechanism,
    wherein at least one restricting member of the plurality of restricting members includes:
        a flange part which straddles the first surface and the second surface so that a position of the flange part with respect to the nozzle ring is fixed;
        a first pin formed integrally with the flange part and disposed in a first hole formed on the first surface; and
        a second pin formed integrally with the flange part and disposed in a second hole formed on the third surface,
    wherein the first pin is fixed to the first hole, and a diameter of the second pin is smaller than a width of the second hole, so that the second pin is movable in the second hole in a radial direction intersecting the rotation axis, and
    wherein the first pin and the second pin extend in an axial direction of the rotation axis and the diameter of the second pin is uniform along the axial direction and larger than a diameter of the first pin.

2. The turbocharger according to claim 1, wherein a cross-sectional shape of the first hole is circular.

3. The turbocharger according to claim 1, wherein the first hole comprises a bottom surface.

4. The turbocharger according to claim 1,
    wherein the second hole is an elongated hole extending in the radial direction.

5. The turbocharger according to claim 1, wherein a length of the second hole in the radial direction is larger than the width of the second hole in the circumferential direction when viewed from an axial direction of the rotation axis.

6. The turbocharger according to claim 1,
    wherein the second hole comprises:
        an intermediate portion extending in the radial direction; and end portions connected to both ends of the intermediate portion in the radial direction, and wherein a shape of each of the end portions is a semicircle.

7. The turbocharger according to claim 6, wherein a diameter of the semicircle is identical to a width of the intermediate portion in the circumferential direction.

8. The turbocharger according to claim 1, wherein the second hole comprises a bottom surface.

9. The turbocharger according to claim 1, wherein an outer edge of the flange part includes a portion positioned on a side opposite to the rotation axis with respect to an outer edge of a main body of the nozzle ring, and wherein the outer edge of the flange part includes a portion positioned on a side opposite to the rotation axis with respect to an inner edge of the drive ring.

10. The turbocharger according to claim 1, wherein a thickness of the flange part is smaller than a distance between the first surface and the third surface.

11. The turbocharger according to claim 1, wherein a restricting surface of the flange part is in contact with the first surface.

12. The turbocharger according to claim 11, wherein a surface of the flange part on a side opposite to the restricting surface is separated from the third surface.

13. The turbocharger according to claim 1, wherein a thickness of the drive ring is smaller than a distance between the first surface and a guide surface of a nozzle ring flange of the nozzle ring, the guide surface facing the drive ring.

14. The turbocharger according to claim 1, wherein the plurality of restricting members all include the flange part, the first pin and the second pin.

15. The turbocharger according to claim 3, wherein the first pin is separated from the bottom surface of the first hole.

16. The turbocharger according to claim 8, wherein the second pin is separated from the bottom surface of the second hole, and wherein the bottom surface of the second hole extends in the radial direction.

17. The turbocharger according to claim 1, wherein an outer edge of a main body of the nozzle ring and an inner edge of the drive ring face each other with a gap between the outer edge of the main body of the nozzle ring and the inner edge of the drive ring.

18. The turbocharger according to claim 1, wherein an outer edge of a main body of the nozzle ring and an outer edge of the second pin on a side opposite to the rotation axis are substantially aligned in the axial direction of the rotation axis.

19. The turbocharger according to claim 1, wherein an inner edge of the second pin on a side of the rotation axis and an inner edge of the first hole on the side of the rotation axis extend in the axial direction of the rotation axis, and wherein the inner edge of the second pin on the side of the rotation axis and the inner edge of the first hole on the side of the rotation axis are unaligned being offset from each other.

* * * * *